(12) United States Patent
Jee et al.

(10) Patent No.: US 8,089,931 B2
(45) Date of Patent: Jan. 3, 2012

(54) FAST HANDOVER METHOD USING CANDIDATE COAS

(75) Inventors: Jung Hoon Jee, Daejeon (KR); Hong Seock Jeon, Daejeon (KR); Jong Hwa Yi, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 724 days.

(21) Appl. No.: 11/636,203

(22) Filed: Dec. 8, 2006

(65) Prior Publication Data
US 2007/0147300 A1   Jun. 28, 2007

(30) Foreign Application Priority Data

Dec. 8, 2005   (KR) .................. 10-2005-0120078
Sep. 12, 2006  (KR) .................. 10-2006-0088119

(51) Int. Cl.
*H04W 4/00* (2009.01)
(52) U.S. Cl. ...... 370/331; 370/313; 455/436; 455/456.2
(58) Field of Classification Search .................. None
See application file for complete search history.

(56) References Cited

U.S. PATENT DOCUMENTS

| 2003/0087646 | A1* | 5/2003 | Funato et al. ................. 455/456 |
| 2004/0156347 | A1* | 8/2004 | Kim ............................... 370/338 |
| 2004/0203740 | A1  | 10/2004 | Won et al. |
| 2005/0041808 | A1* | 2/2005 | He ................................. 380/248 |
| 2005/0163080 | A1* | 7/2005 | Suh et al. ...................... 370/331 |
| 2005/0237962 | A1* | 10/2005 | Upp et al. ..................... 370/313 |

FOREIGN PATENT DOCUMENTS

| KR | 10-2005-0023194 | 3/2005 |
| KR | 1020050027822   | 3/2005 |
| KR | 1020050057704   | 6/2005 |
| KR | 1020060012386   | 2/2006 |
| WO | WO2005/046144   | 5/2005 |

OTHER PUBLICATIONS

Koodli, R., "Fast Handovers for Mobile IPv6", Jul. 2005, RFC 4068, Internet Engineering Task Force (IETF).*
Koodli, R., "Fast Handovers for Mobile IPv6." Jul. 2005. *The Internet Society.*

* cited by examiner

*Primary Examiner* — Rafael Pérez-Gutiérrez
*Assistant Examiner* — Daniel Nobile
(74) *Attorney, Agent, or Firm* — Ladas & Parry LLP

(57) ABSTRACT

Provided is a fast handover method using candidate care-of addresses (CoAs). The method includes obtaining Internet protocol (IP) address information of access routers located adjacent to a previous access router (PAR) to which a mobile node is connected; setting more than one candidate CoAs based on the IP address information; and selecting from the more than one candidate CoAs a CoA of a sub-net to which the mobile node is to move and performing a handover based on the selected CoA. Therefore, a delay and a packet loss caused by the setting of a new NCoAs can be prevented.

5 Claims, 2 Drawing Sheets

FAST HANDOVER METHOD USING CANDIDATE COAS

BACKGROUND OF THE INVENTION

This application claims the benefits of Korean Patent Application No. 10-2005-0120078, filed on Dec. 8, 2005, and Korean Patent Application No. 10-2006-0088119, filed on Sep. 12, 2006, in the Korean Intellectual Property Office, the disclosures of which are incorporated herein in their entirety by reference.

1. Field of the Invention

The present invention relates to a fast handover method, and more particularly, to a fast handover method in which more than one candidate Internet protocol (IP) addresses are set.

2. Description of the Related Art

Conventional technology for preventing a packet loss during a handover of a mobile node is disclosed in U.S. Patent Publication No. 20040203740, entitled "Hybrid Wireless Bridge and Mobile Access Router System and Method." The conventional technology is designed to provide a seamless service to a mobile node without an additional operation through a mobile Internet protocol (Mobile IPv4) by enabling the mobile node to perform a handover without an IP address when moving between sub-nets.

All network connection devices are connected to a central router, and the central router provides a connection point with an external network. Therefore, if a mobile node moves between sub-nets, news paths of packets toward the mobile node are controlled by the central router, and the mobile node, after performing a handover, can still receive a service without the help of the mobile Internet protocol. Since the mobile Internet protocol is not used, a delay caused by the use of the mobile Internet protocol can be reduced, and thus a seamless service can be provided to the mobile node.

Another conventional technology is disclosed in Korean Patent Publication No. 2005-0023194, entitled "Handover Method of Preventing Packet Loss in Mobile Internet Network." This conventional technology relates to a handover method of a mobile connection terminal having mobility in a mobile Internet network. Specifically, in the conventional technology, connection information of a mobile connection terminal retained by a first base station connection device and a first packet connection router to which the mobile connection terminal is currently connected is transmitted to a second base station connection device and a second packet connection router. In addition, a tunnel is formed between the first packet connection router and the second packet connection router. Untransmitted packets in the first base station connection device are forwarded to the first packet connection router and then transmitted to the second base station device through the tunnel. The second base station connection device transmits the received packets to the mobile connection terminal.

RFC 4068 "Fast Handovers for Mobile IPv6 (FMIPv6)" standardized by an International Engineering Task Force (IETF) (www.ietf.org) MIPSHOP working group suggests a method of presetting a new care-of addresses (NCoA) and a method of forwarding a packet by binding a previous care-of address (PCoA) and an NCoA between a previous access router (PAR) and a mobile terminal in order to reduce a packet loss caused by the mobile terminal moving between IPv6 networks.

SUMMARY OF THE INVENTION

The present invention provides a fast handover method which can prevent a delay and a packet loss caused by the setting of a new care-of address (NCoA) during a handover of a mobile node.

According to an aspect of the present invention, there is provided a fast handover method using CoAs. The method includes obtaining Internet protocol (IP) address information of access routers located adjacent to a previous access router (PAR) to which a mobile node is connected; setting more than one candidate CoAs based on the IP address information; selecting a CoA which is based on a IP sub-net information where the mobile node is about to move, from more than one candidate CoAs and performing a handover based on the selected CoA.

In this regard, a delay and a packet loss caused by the setting of an NCoA can be prevented.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
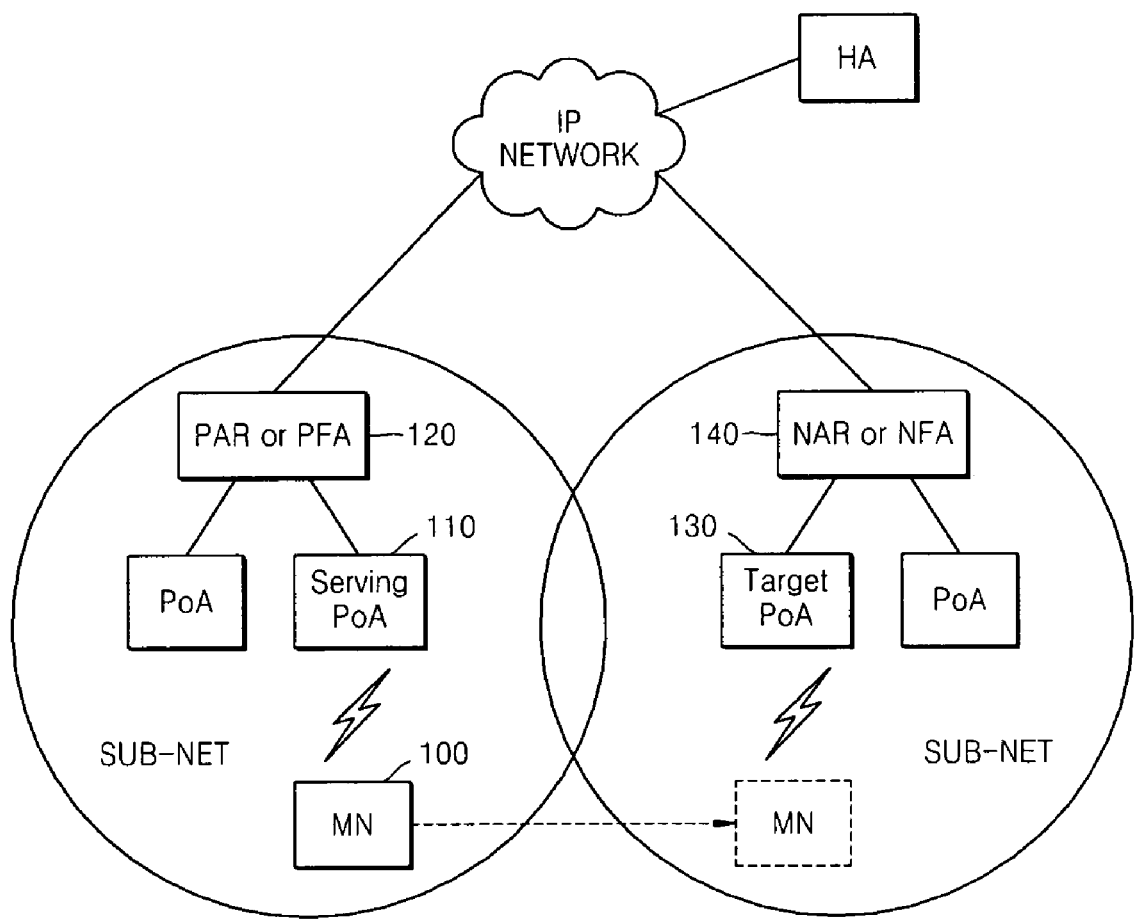
FIG. 1 is a diagram illustrating an entire network in which a fast handover is performed according to an embodiment of the present invention.

FIG. 1 is a diagram illustrating an entire network in which a fast handover is performed according to an embodiment of the present invention.

A mobile node 100 moves between sub-nets. A point of attachment (PoA) that supports layer 2 wireless access in a region where the mobile 100 is currently located is defined as a serving PoA 110, and an access router that supports layer 3 Internet protocol (IP) connection is defined as a previous access router (PAR) 120.

In addition, a PoA that supports layer 2 wireless access in a new sub-net to which the mobile node 100 is to move is defined as a target PoA 130, and an acess router that supports layer 3 IP connection in the new sub-net is defined as a new access router (NAR) 140.

A handover according to the present invention uses a message format defined in RFC 4068 "Fast Handovers for Mobile IPv6 (FMIPv6)" of the International Engineering Task Force (IETF) (www.ietf.org) and further includes the following distinguished characteristics.

A wildcard address, in which all bits in a "New Access Point Link-layer Address" field of a router solicitation for proxy advertisement (RtSolPr) message are set to zero, is set.

A proxy router advertisement (PrRtAdv) message includes information regarding all NARs adjacent to a PAR, such as a PoA identifier, a link-layer address option, a prefix information option, and a new router IP address.

RtSolPr, PrRtAdv, fast binding acknowledge (Fback), handover initiate (HI) and handover acknowledge (Hack), and binding update (BU) messages used in the present invention refer to a message defined by RFC 4068.

Figure 2:
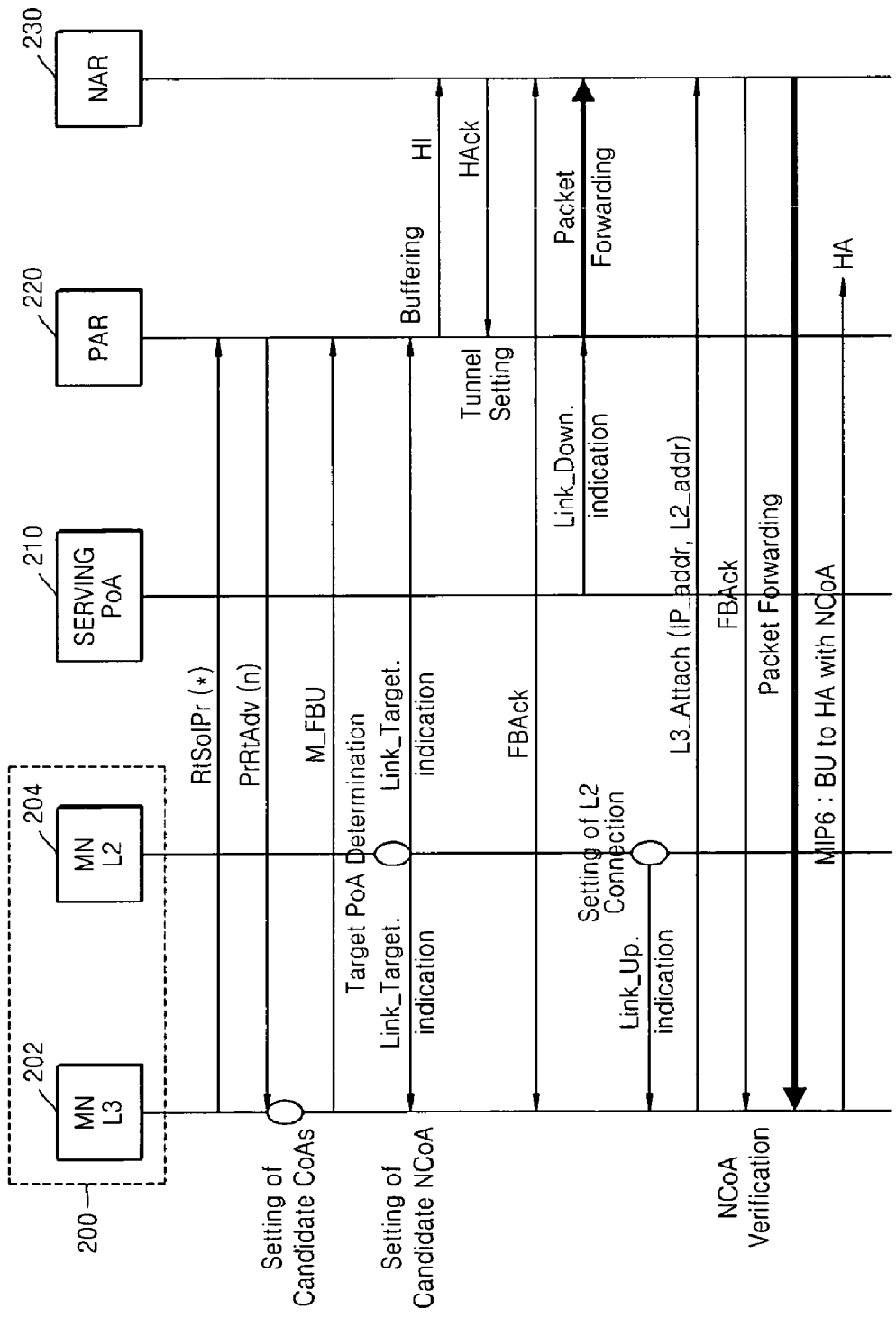
FIG. 2 is a diagram illustrating a fast handover method using candidate care-of addresses (CoAs) according to an embodiment of the present invention.

FIG. 2 is a flowchart illustrating a fast handover method using candidate care-of addresses (CoAs) according to an embodiment of the present invention.

A mobile node 202 transmits an RtSolPr message in which all bits of the "New Access Point Link-layer Address" field are set to zero to a PAR 220, and receives and stores a PrRtAdv message including a link-layer address of a PoA corresponding to a PoA identifier, an access router prefix and mapping information of an access router address in response to the RtSolPr message. When a mobile IPv6 protocol is loaded in the mobile node 202, more than one candidate CoAs are set using more than one prefix information option included in the PrRtAdv message.

When a mobile IPv4 protocol is loaded in the mobile node 202, more than one candidate CoAs are set using more than one new router IP address information included in the PrRtAdv message.

An M-fast binding update (FBU) message includes more than one candidate CoAs set by the mobile node 202. The more than one candidate CoAs are used by the PAR 220 to set a tunnel in order to reduce an IP packet loss caused by the movement of a mobile node 200 when the target PoA(T_PoA) information is determined at layer 2.

The mobile node 202 selects one of the more than one candidate CoAs using T_PoA information corresponding to the time when T_PoA is determined at layer 2. In this case, the determined T_PoA information is delivered through a Link_Target.indication message from layer 2 to layer 3 of the mobile 200. Here, the Link_Target.indication message includes an identifier of the T_PoA information and an address of layer 2.

A specific form of the Link_Target-indication message is shown in Table 1.

TABLE 1

| Field | Type | Description |
| --- | --- | --- |
| MN_HoA_Addr | IP address | Home address of an MN |
| MN_CoA_Addr | IP address | Current CoA address of an MN |
| MN_MAC_Addr | MAC address | MAC address of an MN |
| Target_PoA_MAC_Addr | MAC address | MAC address of a target PoA |
| Target_PoA_ID | Serial No. | Identifier of a target PoA |
| PAR_IP_Addr | IP address | IP address of a PAR |
| NAR_IP_Addr | IP address | IP address of a NAR |

Layer 3 of a mobile node 202 receives the Link_Target.indication message from layer 2. Then the mobile node 202 selects a candidate NCoA corresponding to a target PoA from the more than one candidate CoAs using Target_PoA_ID included in the Link Target.indication message.

The Link_Target.indication message is transmitted from layer 2 of the mobile node 204 to a serving PoA 210, which, in turn, transmits the Link_Target.indication message to the current PAR 220.

When receiving the Link_Target.indication message, the PAR 220 starts packet buffering for the mobile node 200 using MN-HOA_Addr and MN_CoA_Addr included in the Link_Target.indication message. In addition, the PAR 220 exchanges the HI message and the HAck message with an NAR 230 using NAR_IP_Addr included in the received Link_Target.indication message in order to identify whether the NAR 230 can accept the selected candidate NCoA.

In other words, the HI message includes the selected candidate NCoA, and the verification result of the candidate NCoA is informed to the PAR 220 through the HAck message.

If it is identified that the candidate NCoA has been verified based on the HAck message, the PAR 220 forms a tunnel for forwarding buffered packets toward the NAR 230. Specifically, an actual time when the buffered packets are forwarded is when the PAR 220 receives from the serving PoA 210 a Link_Down.indication message indicating that layer 2 connection between the mobile node 200 and the serving PoA 210 has been terminated.

A specific form of the Link_Down.indication message is shown in Table 2.

TABLE 2

| Field | Type | Description |
| --- | --- | --- |
| MN_HoA_Addr | IP address | Home address of an MN |
| MN_CoA_Addr | IP address | CoA address of an MN |
| MN_MAC_Addr | MAC address | MAC address of an MN |
| Target_PoA_MAC_Addr | MAC address | MAC address of a target PoA |
| Target_PoA_ID | Serial No. | Identifier of a target PoA |
| PAR_IP_Addr | IP address | IP address of a PAR |

If the Link_Down.indication message indicating the termination of the layer 2 connection between the mobile node 200 and the serving PoA 210 arrives at the PAR 220 before the setting of the tunnel (that is, before the PAR 220 and the NAR 230 exchange the Hi and HAck messages), packet forwarding from the PAR 220 to the NAR 230 starts immediately after the tunnel is set through the exchange of the HI and HAck messages.

The mobile node 200 sets layer 2 connection in a new sub-net, updates information regarding layer 3 connection from the NAR 230, and receives the FBack message. Based on the received FBack message, the mobile node 200 finally verifies the candidate NCoA. If the verification result indicates that there is no collision in using the preconfigured NCoA, the mobile node 200 transmits the BU message to a home agent (HA).

According to the present invention, an IP packet can be buffered and forwarded in layer 3 using target PoA information determined in layer 2, thereby avoiding an abnormal situation caused by a prediction error.

In addition, since an NCoA is selected when the target PoA is determined by presetting more than one candidate NCoAs, a delay caused by newly setting an NCoA in a new network can be avoided.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the following claims, and all differences within the scope will be construed as being included in the present invention.

What is claimed is:

1. A fast handover method using candidate care-of addresses (CoAs), the method comprising:

obtaining a layer 3 Internet protocol (IP) address information of access routers located adjacent to a previous access router (PAR) to which a mobile node is connected;

setting more than one candidate CoAs based on the IP address information of more than one access router, wherein the setting of the more than one candidate CoAs comprises:

setting more than one candidate CoAs is based on prefix information included in the IP address information if a Mobile IPv6 protocol is loaded in the mobile node, and setting more than one candidate CoAs based on the router IP address information included in the IP address if a Mobile IPv4 protocol is loaded in the mobile node; and selecting a CoA which is based on a layer 2 IP sub-net information where the mobile node is about to move, and wherein after selecting the CoAs from the more than one candidate CoAs having been set based on the IP address information of more than one access router then performing a handover based on the selected CoA, wherein IP packets are configured to be buffered and forwarded in the layer 3 IP address information, which is configured based on the selected CoA from where the mobile node is about to move, wherein the selected CoA is configured based on the layer 2 IP sub-net information, wherein the selected CoA is configured based on a PoA of a subnet to which the mobile node is about to move, wherein the selected CoA is configured to be determined when the T_PoA is determined in the layer 2 IP sub-net information from the setting of more than one of the candidate CoAs, and wherein the T_PoA is configured based on the subnet to which the mobile node is about to move.

2. The method of claim 1, wherein the obtaining of the IP address information comprises transmitting an RtSolPr message, which includes a wildcard address, from the mobile node to the PAR and receiving a PrRtAdv message, which includes point of attachment (PoA) identifiers of the access routers that located adjacent to the PAR, prefix information and router IP address information, using the PAR in response to the RtSolPr message.

3. The method of claim 1, wherein the setting of the more than one candidate CoAs further comprises transmitting binding information regarding the selected CoA to the PAR.

4. The method of claim 1, wherein the selecting of the candidate CoA and the performing of the handover comprises:

selecting a CoA corresponding to a sub-net from the more than one candidate CoAs if the sub-net is determined as a sub-net to which the mobile node is about to move;

buffering packets for the mobile node and setting a tunnel between the PAR and an access router of the subnet based on the selected CoA using the PoA, and forwarding the buffered packets toward the mobile node if the connection between the mobile node and the PAR is terminated.

5. The method of claim 1, wherein the selecting of the candidate CoA and the performing of the handover comprises:

selecting a corresponding CoA from the more than one candidate CoA based on the PoA of the subnet to which the mobile node is about to move if the T_PoA is determined in the layer 2;

transmitting information regarding the determination of the PoA from the mobile node to the PAR;

buffering packets using the PAR;

verifying the selected CoA between the PAR and an access router mapped to the T_PoA and setting a tunnel; and forwarding the buffered packets through the tunnel if the connection between the mobile node and the PAR is terminated.

* * * * *